(12) United States Patent
Day et al.

(10) Patent No.: US 12,510,486 B2
(45) Date of Patent: Dec. 30, 2025

(54) METHOD OF AND SYSTEM FOR DETECTING THE CONCENTRATION OF BRINE CONSTITUENTS

(71) Applicant: SciAps, Inc., Woburn, MA (US)

(72) Inventors: David Day, Boxford, MA (US); Morgan Jennings, Lynnfield, MA (US)

(73) Assignee: SciAps, Inc., Andover, MA (US)

( * ) Notice: Subject to any disclaimer, the term of this patent is extended or adjusted under 35 U.S.C. 154(b) by 326 days.

(21) Appl. No.: 18/300,602

(22) Filed: Apr. 14, 2023

(65) Prior Publication Data

US 2024/0085337 A1 Mar. 14, 2024

Related U.S. Application Data

(60) Provisional application No. 63/406,010, filed on Sep. 13, 2022.

(51) Int. Cl.
*G01N 21/31* (2006.01)
*G01N 21/27* (2006.01)
*G01N 21/71* (2006.01)

(52) U.S. Cl.
CPC ......... *G01N 21/718* (2013.01); *G01N 21/274* (2013.01); *G01N 21/31* (2013.01); *G01N 2201/0221* (2013.01)

(58) Field of Classification Search
CPC ............... G01N 2201/0221; G01N 21/718
See application file for complete search history.

(56) References Cited

U.S. PATENT DOCUMENTS

| | | |
|---|---|---|
| 6,359,687 B1 | 3/2002 | Cheng |
| 9,360,367 B2 | 6/2016 | Day et al. |
| 9,625,391 B2 | 4/2017 | Lisner et al. |
| 9,683,941 B2 | 6/2017 | Ollikainen et al. |
| 10,209,196 B2 | 2/2019 | Day |
| 2014/0036253 A1 | 2/2014 | Wang et al. |

(Continued)

FOREIGN PATENT DOCUMENTS

CN 114778523 A * 7/2022

OTHER PUBLICATIONS

Pengju Xing, "Quantitative analysis of lithium in brine by laser-induced breakdown spectroscopy based on convolutional neural network", Jun. 26, 2021 (Year: 2021).*

(Continued)

*Primary Examiner* — Maurice C Smith
(74) *Attorney, Agent, or Firm* — Iandiorio Teska & Coleman, LLP

(57) ABSTRACT

A method of and system for detecting the concentration of a target element in a brine wherein the brine is sampled into a container and an aerosol generator is used to generate an aerosol stream of the sampled brine in the container. The aerosol stream may be directed to a collection system. A handheld LIBS device directs a laser beam to the aerosol stream at a location between the aerosol generator and the collection system to generate a plasma. The plasma is analyzed to detect intensity data for a reference element based on the generated plasma and to detect the intensity data of a target element based on the generated plasma. The concentration of the target element in the brine is calculated based on the reference element intensity data and the target element intensity data.

75 Claims, 9 Drawing Sheets

(56) References Cited

U.S. PATENT DOCUMENTS

2018/0003640 A1  1/2018 Day
2020/0225163 A1  7/2020 Day

OTHER PUBLICATIONS

Jinyibo, "Handheld LIBS Spectrometer for Aluminium Alloy", https://www.youtube.com/watch?v=oUCLXXuJgJI, Mar. 9, 2020 (Year: 2020).*

Metal Analysis Group, "FAST—SAFE—DURABLE. Sullivan Scrap Reviews the Rigaku Red Laser KT Series Handheld LIBS Analyzer", https://www.youtube.com/watch?v=wgU4EzrcXAY, Oct. 4, 2019 (Year: 2019).*

Written Opinion of the International Searching Authority for International Application No. PCT/US23/72008 dated Jan. 26, 2024, four (4) pages.

Andrews, Hunter B. and Myhre, Kristian G., "Quantification of Lanthanides in a Molten Salt Reactor Surrogate Off-gas Stream Using Laser-Induced Breakdown Spectroscopy," Applied Spectroscopy, Mar. 24, 2022, vol. 76(8), 877-886.

* cited by examiner

*FIG. 1*

METHOD OF AND SYSTEM FOR DETECTING THE CONCENTRATION OF BRINE CONSTITUENTS

RELATED APPLICATIONS

This application claims benefit of and priority to U.S. Provisional Application Ser. No. 63/406,010 filed Sep. 13, 2022, under 35 U.S.C. §§ 119, 120, 363, 365, and 37 C.F.R. § 1.55 and § 1.78, which is incorporated herein by this reference.

FIELD OF THE INVENTION

This subject invention relates to laser induced breakdown spectroscopy used to detect the concentration of brine constituents, for example, the concentration of lithium and other elements in a lithium brine.

BACKGROUND OF THE INVENTION

Lithium brine deposits are accumulations of saline ground water that are enriched with lithium. Lithium salts can be extracted from these brines at a profit for use in, inter alia, lithium ion batteries. Few sources of lithium are cost effective and logical for extraction. To determine the concentration of lithium in a lithium brine, a sample is normally taken and sent to a laboratory and tested (using, for example, inductively coupled plasma technology). But, laboratory tests are costly and time consuming. See also U.S. Pat. Nos. 9,683,941; 9,625,391; and 10,209,196 all incorporated herein by this reference. The same is true for other brines and their constituents.

BRIEF SUMMARY OF THE INVENTION

Featured, in one example, is a new on-site brine constituent concentration determination method and system preferably employing a handheld LIBS analyzer device. Other elements present in the brine can also be detected.

In one aspect, the handheld LIBS analyzer device can be used as intended in the field to analyze, for example, alloys, ores, powders, scrap, and the like and also then used in accordance with the inventive method and system for brine testing resulting in an analyzer with multiple potential uses.

Also featured is a LIBS-based brine concentration determination method and system which reduces the cost and time associated with lab-based tests.

If a handheld LIBS analyzer is used to directly test a liquid brine sample, the resulting plasma causes splashing and bubbles. The splashes can dirty the analyzer optical components. The resulting bubbles reduce the frequency of the LIBS analyzer laser pulses during a given test (e.g., to less than 10 Hz) resulting in poor quality data.

One preferred solution to these problems is to first generate an aerosol stream of the brine sample (e.g., a lithium brine sample). The LIBS device is aimed at the aerosol stream and the result is the ability to accurately detect the lithium (and other elemental) concentrations in a brine without dirtying the LIBS device optics. The frequency of the laser pulses can be higher (e.g., 50 Hz) which results in more data in a fixed amount of sampling time allowing more spectral averaging which in turn yields better reproducibility and accuracy.

Also featured is a collection system which collects and removes the hazardous aerosol stream from the work area.

In one embodiment, the brine sample, the LIBS analyzer, the aerosol generator, and the collection system are separate components set up on site at a brine extraction site. In another embodiment, the LIBS analyzer is fitted with a nose section which can be coupled to the aerosol generator and the vacuum source.

Featured is a method of detecting the concentration of a target element in a brine. Brine is sampled into a container and an aerosol generator is used to generate an aerosol stream of the sampled brine in the container directed to a collection system. A handheld LIBS device is used to direct a laser beam to the aerosol stream at a location between the aerosol generator and the collection system to generate a plasma. The plasma is analyzed to detect a reference element intensity data based on the generated plasma and to detect the intensity data of a target element based on the generated plasma. The concentration of said target element in the brine is calculated based on the reference element intensity data and the intensity data for said target element.

The analyzing steps and the step of calculating the concentration of said one or more additional elements in the brine are preferably carried out by the handheld LIBS device. In one embodiment, pulsed laser beams are directed to the aerosol stream for a given test and analyzing the plasma includes averaging the reference element intensity data for the pulsed laser beams and averaging the intensity data for said target element for the pulsed laser beams. Calculating the concentration of the said one or more brine elements in the brine may include solving a function including the ratio of an averaged target element brine intensity data and the averaged reference element intensity data. The function is preferably based on an analysis of known brine concentrations. The function may include a correction factor such as intensity data for another brine element.

Preferably, the aerosol stream is generated just before a first laser beam is directed to the aerosol stream and stops just after a last laser beam is directed to the aerosol stream during a test and the collection system is energized just before the aerosol system is generated and de-energized just after the aerosol stream stops. The laser beam may be directed normal or near normal to the aerosol stream.

The brine may be a lithium brine, the target element is lithium, and the reference brine element is hydrogen or oxygen. When the brine is a lithium brine, the target brine element can be Na, K, B, Ca, and/or Mg. The brine may be a salt, calcium, iodine, magnesium, potash, bromine, boron, colloidal silicone, or soda ash brine.

Also featured is a brine concentration measurement system comprising: a container of sampled brine; a collection system; an aerosol generator fluidly coupled to the brine in the container and configured to generate an aerosol stream of the sampled brine directed at the collection system; and a handheld LIBS device configured to direct a laser beam to the aerosol stream at a location between the aerosol generator and the collection system to generate a plasma, detect an intensity data for a reference element in the aerosol stream based on the generated plasma, and detect intensity data for a target element in the aerosol stream based on the generated plasma in order to calculate the concentration of said target element in the sampled brine.

The system may further include means for calculating the concentration of said target element in the brine such as the handheld LIBS device. In one example, pulsed laser beams are directed to the aerosol stream for a given test and the LIBS device is configured to average the reference element intensity data for the pulsed laser beams and to average the intensity data for said target element for the pulsed laser beams. The LIBS device may be configured to solve a function including the ratio of averaged element brine target intensity data and averaged reference element intensity data. The function may be based on an analysis of known brine concentrations and may include a correction factor such as intensity data for another brine element.

The system may include a controller which is configured to generate the aerosol stream just before a first laser beam is directed to the aerosol stream and stop the aerosol stream just after a last laser beam is directed to the aerosol stream during a test and/or to energize the collection system just before the aerosol system is generated and to deenergize the collection system just after the aerosol stream stops.

Also featured is a method of detecting the concentration of lithium in a lithium brine including sampling the lithium brine into a container; using an aerosol generator to generate an aerosol stream of the sampled lithium brine in the container, said aerosol stream directed to a collection system; and using a handheld LIBS device to direct a laser beam to the aerosol stream at a location between the aerosol generator and the collection system to generate a plasma, analyze the plasma to detect hydrogen intensity data, analyze the plasma to detect lithium intensity data, and calculate the concentration of lithium in the brine based on a function including the ratio of the hydrogen intensity data and the lithium intensity data.

A lithium brine concentration measurement system includes a collection system; an aerosol generator fluidly coupled to lithium brine in a container and configured to generate an aerosol stream of the sampled lithium brine directed at the collection system; and a handheld LIBS device configured to direct a laser beam to the aerosol stream at a location between the aerosol generator and the collection system to generate a plasma, detect an intensity data for hydrogen in the aerosol stream, detect intensity data for lithium in the aerosol stream, and calculate the concentration of lithium in the sampled lithium brine using a function including the ratio of the lithium intensity data and hydrogen intensity data.

A novel brine concentration measurement system includes a nose section fluidly connectable to a collection system and an aerosol generator fluidly coupled to brine in a container and configured to generate an aerosol stream of the sampled brine directed at the collection system. A handheld LIBS device is fitted to a nose section and configured to direct a laser beam to the aerosol stream at a location between the aerosol generator and the collection system to generate a plasma, detect an intensity data for a reference element in the aerosol stream based on the generated plasma, and detect intensity data for a target element in the aerosol stream based on the generated plasma in order to calculate the concentration of said target element in the sampled brine.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

Figure 1:
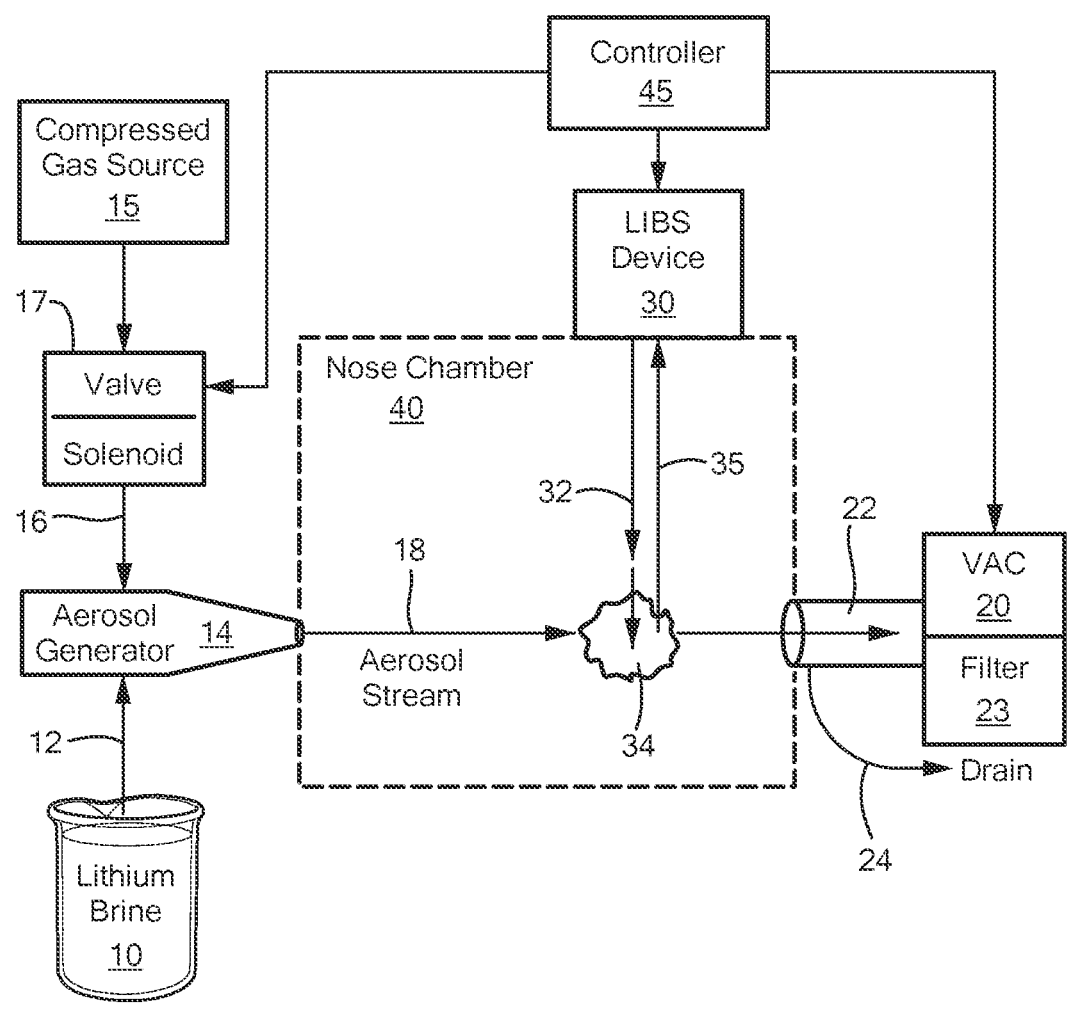

FIG. 1 is a schematic block diagram showing the primary components associated with an exemplary brine concentration detection system;

DETAILED DESCRIPTION OF THE INVENTION

Figure 2:
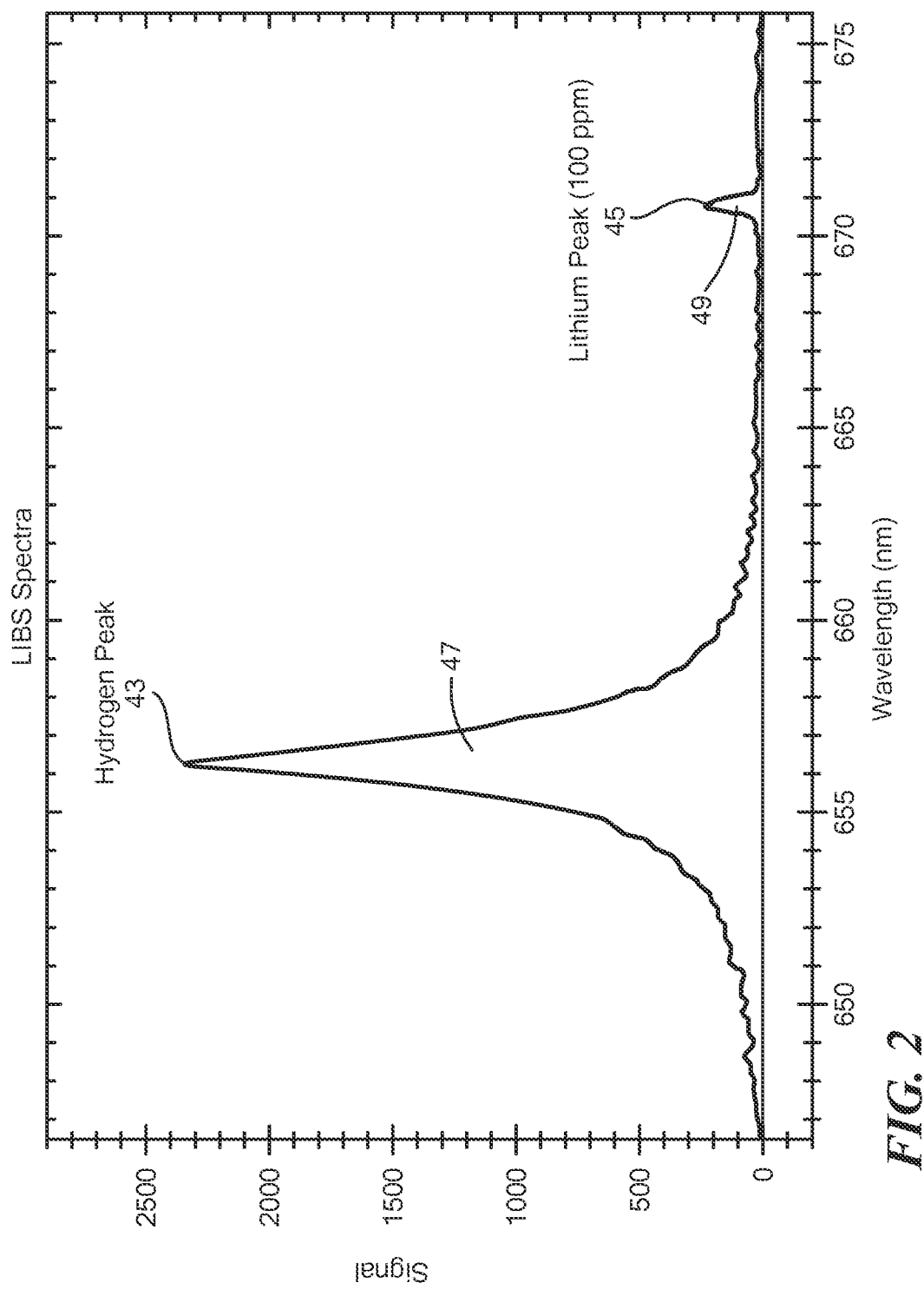
FIG. 2 is a graph showing the output of the LIBS device of FIG. 1 (intensity versus wavelength) for a lithium brine.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In the example of FIG. 1, lithium brine is sampled into container 10 and the brine therein is fluidly coupled via conduit 12 to aerosol generator 14 (e.g., an airbrush) also connected to a compressed gas (e.g., air or argon) source 15 via valve/solenoid 17 as shown at 16. Other aerosol generators are described in U.S. Pat. No. 6,359,687 incorporated herein by this reference. See also Andrews, Hunter B. and Myhre, Kristian G., Quantification of Lanthanides in a Molten Salt Reactor Surrogate Off-gas Stream Using Laser-Induced Breakdown Spectroscopy, Applied Spectroscopy, Vol 76(8), 877-886 incorporated herein by this reference.

The resulting aerosol stream 18 of the sampled lithium brine in container 10 is directed (here horizontally) to collection system 20, for example a shop type vacuum cleaner (with optional filter 23) connected to hose 22 which may include liquid drain 24. Alternatively, the vacuum source device 20 could include the liquid drain. The collection system helps ensure the aerosol stream does not contaminate the surrounding workspace/location.

Here, the target element is lithium and the reference element is hydrogen.

Handheld LIBS device 30 is oriented to direct a laser beam 32 (e.g., 5-7 mJ) normal or near normal to the aerosol stream 18 between aerosol generator 14 and collection system 20 creating a plasma 34 the photons 35 of which are analyzed by the handheld LIBS system detection subsystem 30. See, for example, U.S. Pat. No. 9,360,367 incorporated herein by this reference. A gas (e.g., argon) purge may be used in some instances.

In some embodiments, aerosol generator 16, LIBS device 30, and collection source 20 are mounted to a tabletop upon which rest container 10. In another embodiment, LIBS device 30 is fitted with a nose chamber 40 configured to be fitted to the nose section of the handheld LIBS device and to accept the aerosol generator 14 on one side and the collection subsystem 20 on the other side for testing in the field.

The output of the detection side spectrometer(s) of the LIBS device 30 are wavelength and intensity data. For example, FIG. 2 shows a peak reference intensity 43 I(H) at 656 nm representing hydrogen (from the water in the brine)

and a target peak 45 I(Li) at 671 nm representing lithium in the brine. Intensity data as used herein can mean the value of the Y-axis or the respective areas 47, 49 under each peak.

In the subject method, in one embodiment, the concentration of lithium in the brine is based on the lithium and hydrogen intensity data. In one example, numerous laser pulses (e.g., 150 at 50 Hz for a 3-second test) are generated and all or select resulting intensity data values are averaged. Then, the concentration of the lithium in the brine is a function of a ratio of the average lithium intensity data (the target element) and the average hydrogen intensity data (the reference element):

$$\text{Concentration of lithium in water} = f(I(Li)\text{avg}/I(H)\text{avg}) \quad (1)$$

An exemplary calibration function is based on an analysis of known brine lithium concentrations $$(e.g., Ax^2 + Bx + C) \quad (2)$$

where x is the ratio of lithium to hydrogen and A, B, and C are constants derived from running tests on the known calibration lithium brine samples. Each lithium brine sample can be subject to more than one test each including a plurality of laser pulses and spectral data collection processes. In other examples, the concentration of lithium in the brine is the ratio of lithium to hydrogen peak values multiplied by a calibration constant derived from known brine concentrations.

The signal ratios are used because, for each laser shot, there can be variations in aerosol drop size, laser power, and the like. Thus, using the ratios and a calibration function eliminates the spectrum to spectrum variation in the overall signal by merging at least two elements, one being a reference element, and then taking the ratio of the two elements to get the concentration results in a more accurate test. In the lithium case, lithium and H peak areas can be measured and then the ratio taken. Since the only source of hydrogen is from the water, the ratio yields a concentration (using a calibration constant, polynomial, or other calibration function). This process also takes out the effects from laser power fluctuations and aerosol drop size and thus brightness variation. By fitting the ratio measurements of known samples, calibration polynomials or other functions can be developed that cover three to four orders of magnitude. Other calibration methods could be used such as partial least squares, artificial neural network, and similar machine learning algorithms.

The calculations discussed above can be carried out by the appropriately programmed processor(s) of the handheld LIBS device and/or external controller 45, FIG. 1 (e.g., one or more microcontrollers, microprocessors, a laptop computer, or the like). Controller 45 (or the processor(s) of the handheld LIBS device) can also be used to control (e.g., via its solenoid valve) aerosol generator 14 so it begins generating the aerosol stream 18 just before the first laser beam is directed to the aerosol stream 18 in a given test and then stops generating the aerosol system 18 just after the last laser shot of a test is generated. Similarly, controller 15 (and/or the processor(s) of LIBS device 30) can control collection system 20 to energize it just before the aerosol stream is generated and to deenergize the collection system 20 just after the aerosol stream stops.

Figure 3:
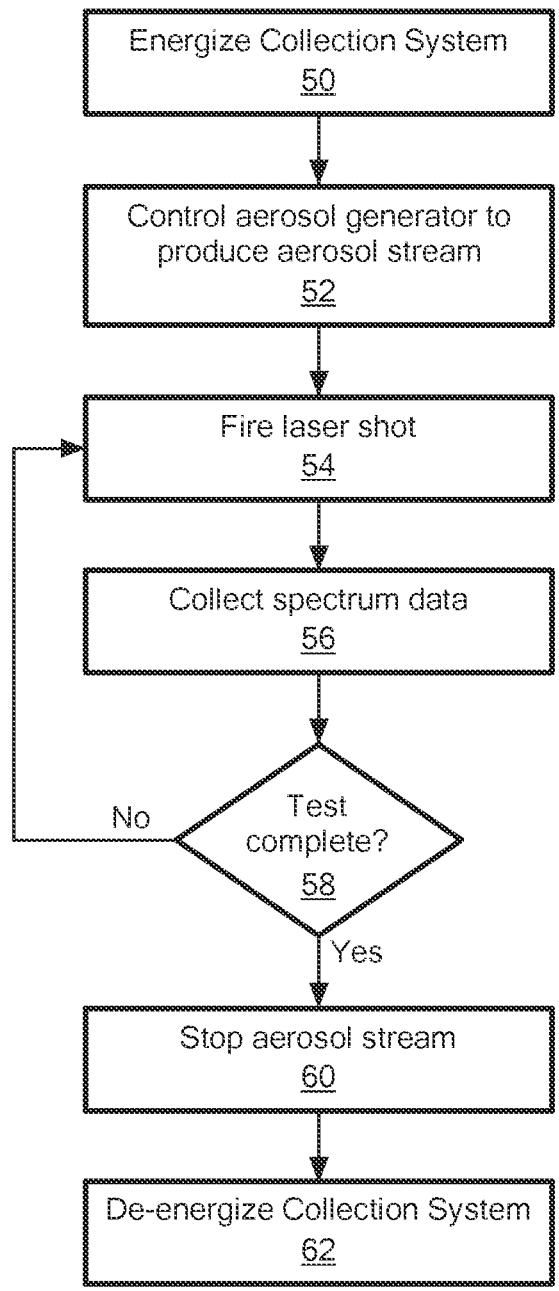
FIG. 3 is a flow chart depicting the primary steps associated with one exemplary method of detecting the concentration of one or more elements in a brine.

Thus, in FIG. 3, the collection system is energized, step 50 and then the aerosol generator is controlled to produce the aerosol stream, step 52. The first laser shot in a test is fired, step 54, spectrum data is collected, step 56 and this process is repeated, step 58 until the test is completed whereupon the aerosol stream is stopped, step 60 and then the collection system is deenergized, step 62.

The concentration of other brine elements (e.g., Na, K, B, Ca, and Mg) can be measured in a similar fashion by ratioing their intensity data with hydrogen intensity data. In some cases, a correction factor is included in the concentration function. For example, in cases where there is tremendous Na loading in a brine, included can be a ratio calculation correction factor for the Na content or possibly the K content as well. For example, $$\text{Lithium concentration} = f(I(Li) + K^*I(Na))/I(H) \quad (3)$$

where K is a constant. The sodium intensity data here is the correction factor.

Figure 4A:
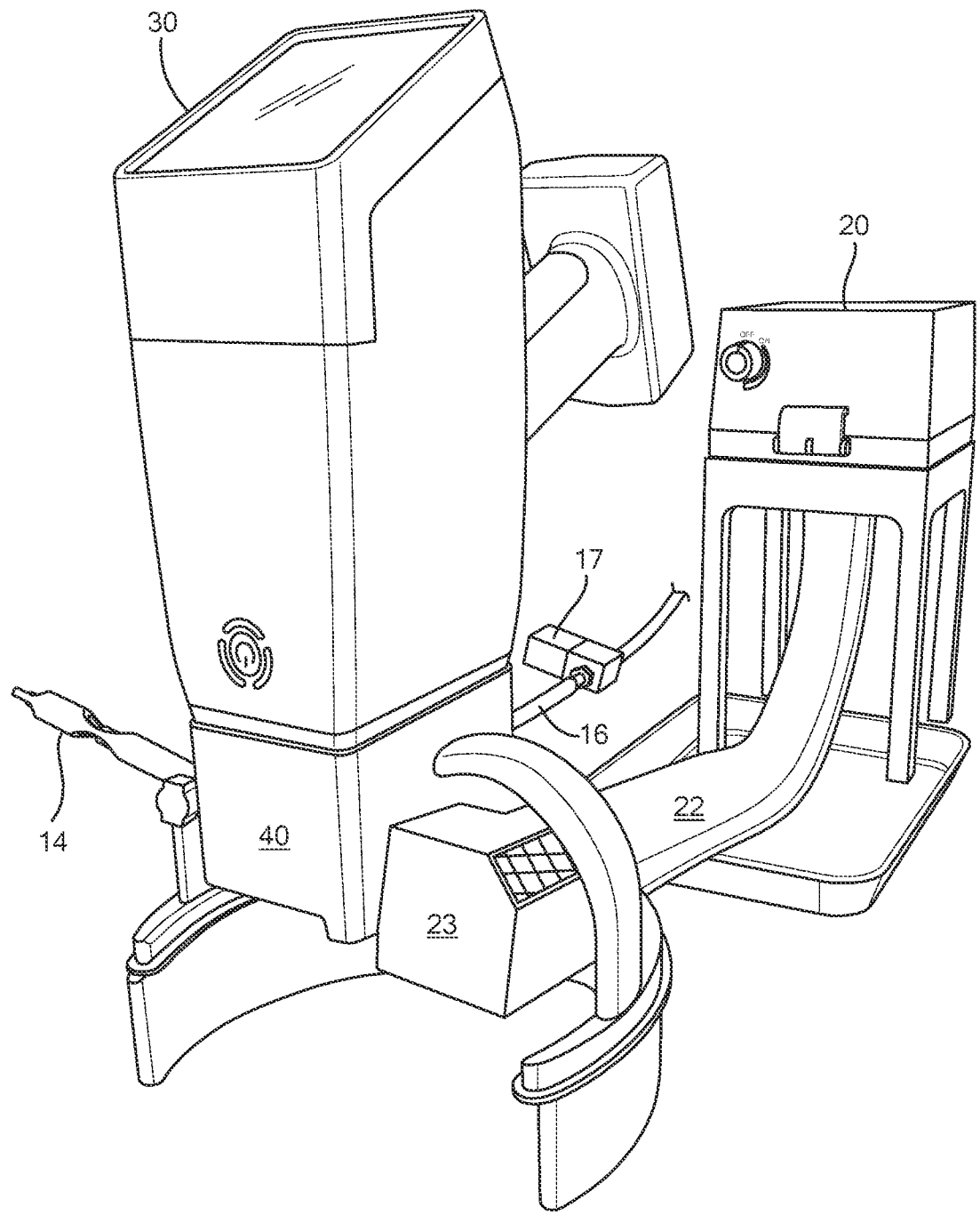
FIGS. 4A-4F are schematic views of a test/experimental setup of a lithium brine concentration detection system in accordance with an example.
Figure 4B:
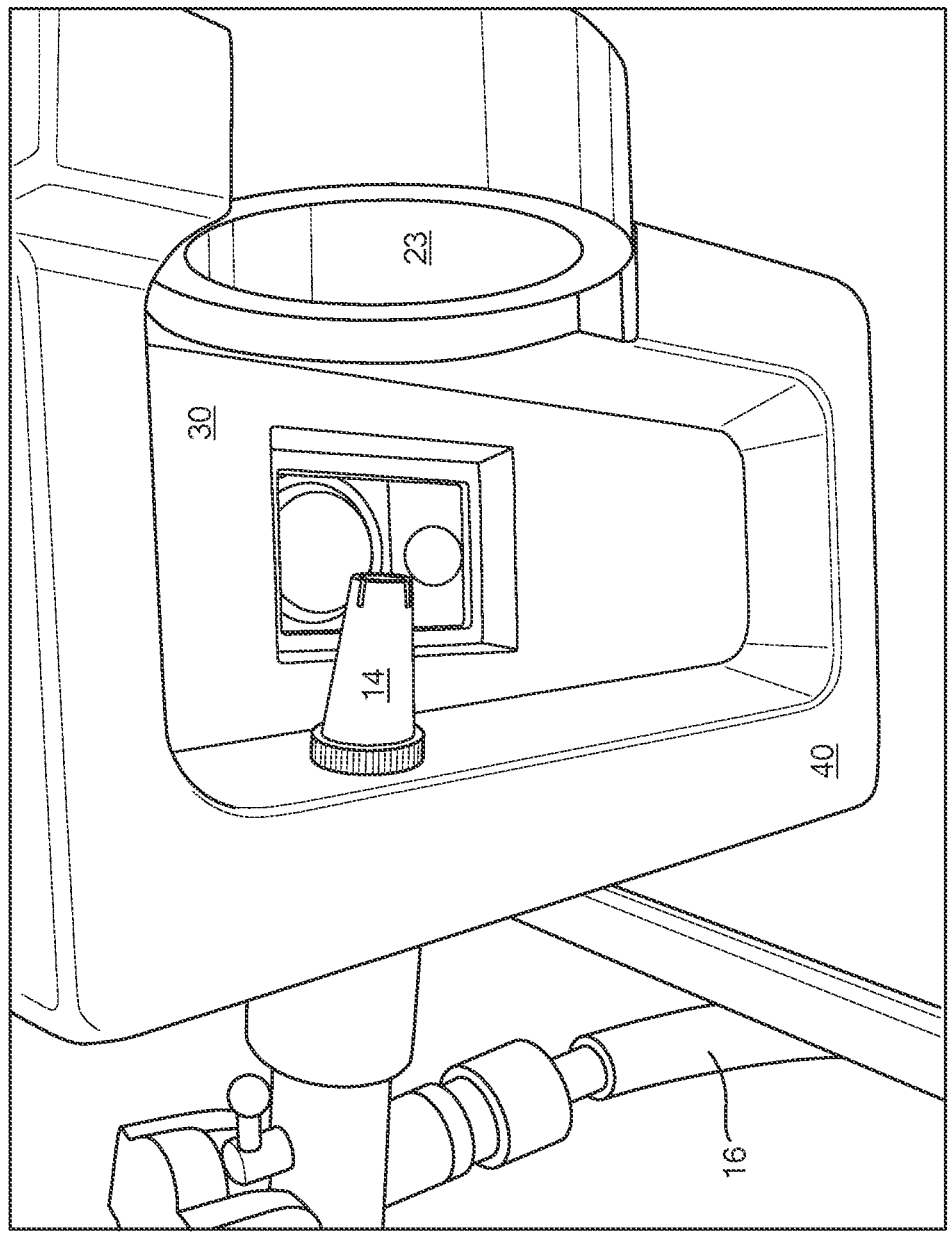
Figure 4C:
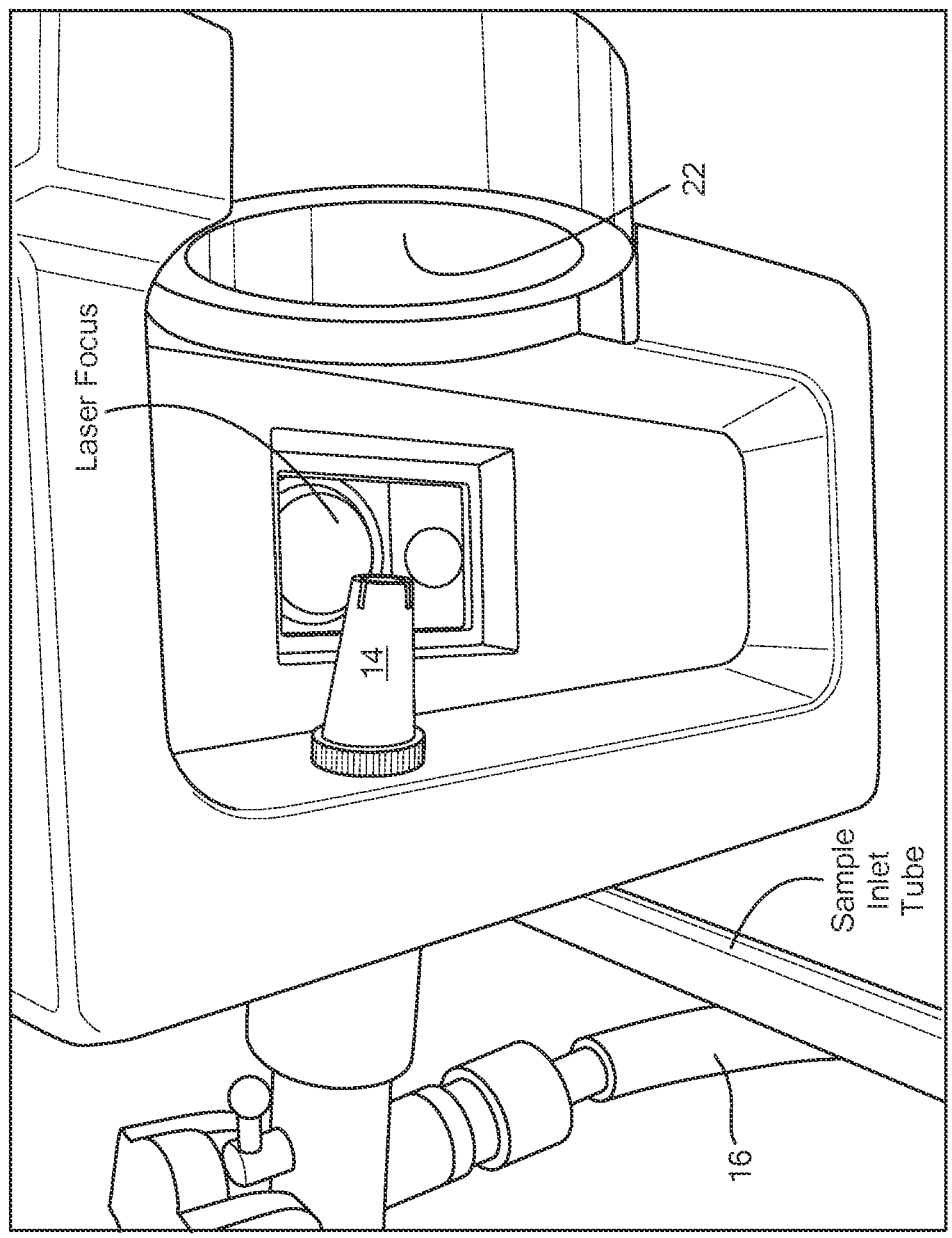
Figure 4D:
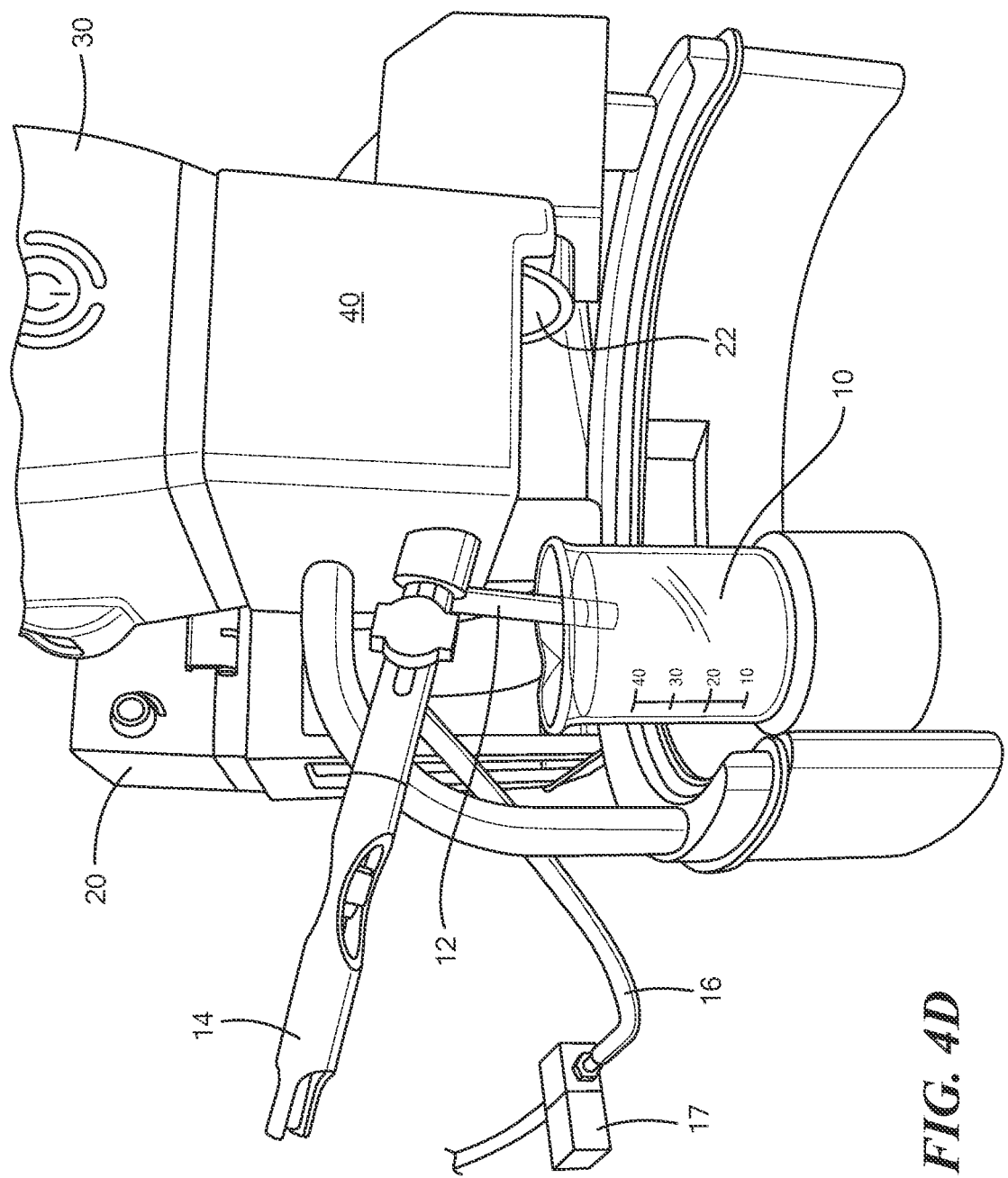
Figure 4E:
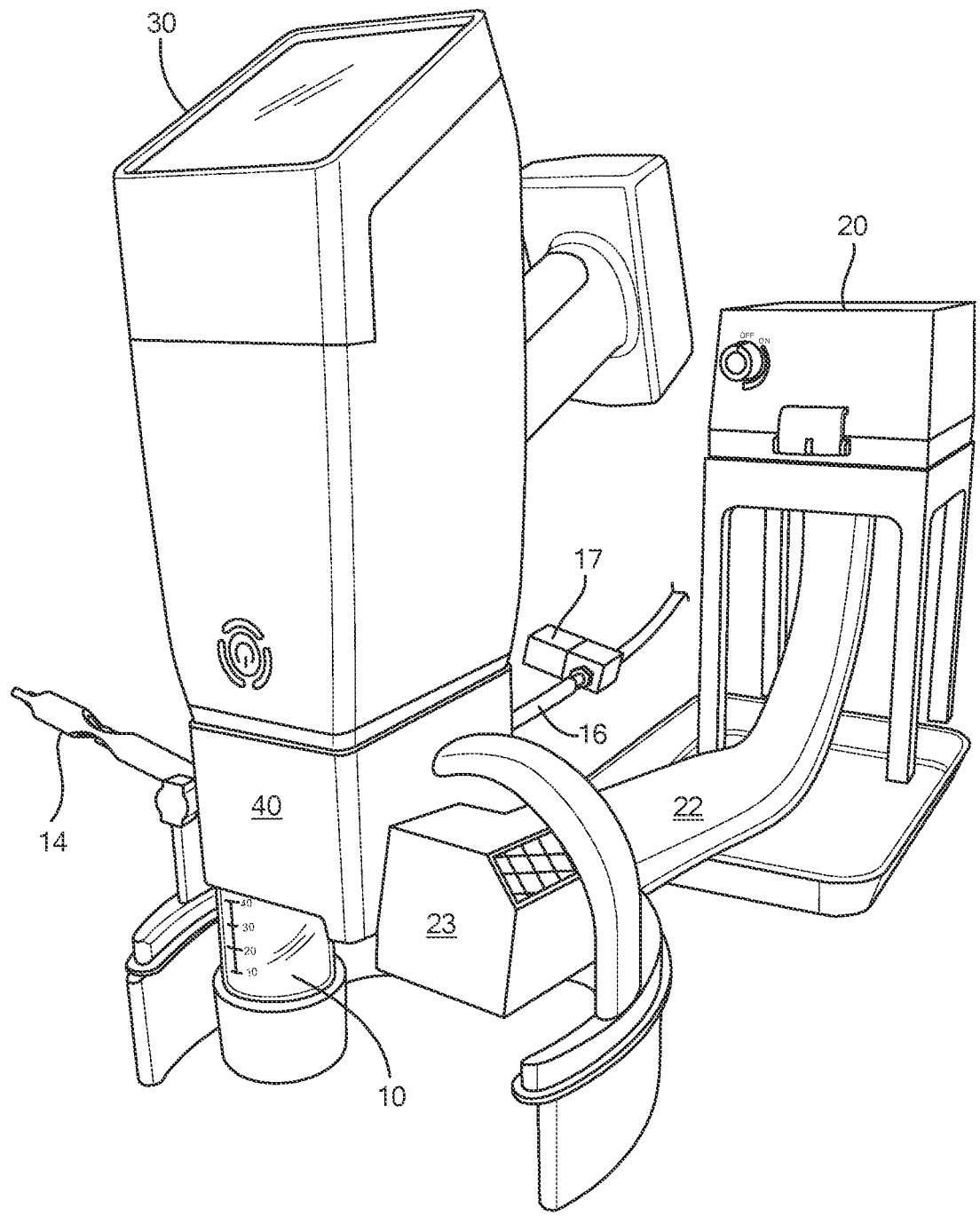
Figure 4F:
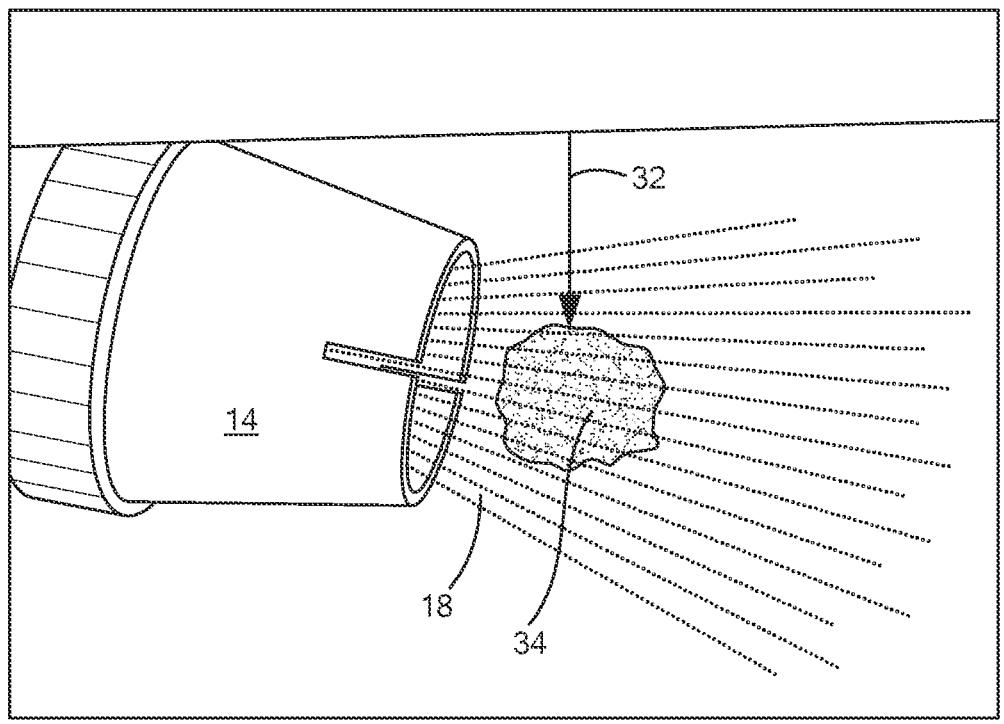

FIGS. 4A-F depict an experimental/test setup showing handheld LIBS device 30 with nose section 40, or placed in nose section 40, aerosol generator 14, and collection system 20 with hose 22, and nozzle 23 oriented to capture the aerosol stream after it is struck by the pulsed laser beams. Container 10 includes the lithium brine sucked into the aerosol generator 14 via tube 12. Line 16 is the pressurized gas delivery to the aerosol generator 14. Air valve/solenoid 17 is also shown. FIG. 4F shows the plasma generated when the laser beam strikes the aerosol stream.

One result is the splashing and dirtying of the optics of the handheld laser device is now less of a concern as opposed to when the laser beam was aimed directly into the lithium brine contents of container 10. Also, a faster laser pulse frequency (e.g., 50 Hz) can be used since no bubbles are created as was the case if the laser beam was aimed directly into the brine. At higher frequencies (e.g., 50 Hz), significantly more data is obtained in a similar amount of time for better accuracy especially when using a lower powered battery-operated handheld laser device. The handheld LIBS analyzer device can be used in the field as intended for analyzing for example, alloys, ores, powders, scrap, and the like and also used in accordance with the inventive method and system for brine testing resulting in a lower cost for the user.

During lithium brine extraction and processing, the new method and system can be used to detect, for example, the concentration of lithium and other elements in the brine down to tens or hundreds of parts per million quickly and in a less costly manner in order to make various decisions during the extraction and processing of the brines.

Besides lithium brines, other brines can be analyzed as well. Examples include salt (NaCl) brines, calcium, iodine, magnesium, potash, bromine, boron, colloidal silicone, and/or soda ash brines. In some examples, the reference element is hydrogen. But, oxygen or other reference elements may be used. Typically, there is a target element such as lithium in a brine where the reference element is hydrogen or oxygen. But, even in a lithium brine, other target elements may be analyzed. And, in other brines, the target element(s) may differ as may the reference element(s).

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method of detecting the concentration of a target element in a brine, the method comprising:
   sampling the brine into a container;
   using an aerosol generator to generate an aerosol stream of the sampled brine in the container, said aerosol stream directed to a collection system;
   using a handheld LIBS device to:
      direct pulsed laser beams to the aerosol stream at a location between the aerosol generator and the collection system to generate a plasma;
   analyzing the plasma to detect a reference element intensity data based on the generated plasma;
   analyzing the plasma to detect the intensity data of a target element based on the generated plasma;
   calculating the concentration of said target element in the brine based on the reference element intensity data and the intensity data for said target element and;
   the pulsed laser beams directed to the aerosol stream for a given test and analyzing the plasma includes averaging the reference element intensity data for the pulsed laser beams and averaging the intensity data for said target element for the pulsed laser beams.

2. The method of claim 1 in which the analyzing steps and the step of calculating the concentration of said target element in the brine is carried out by the handheld LIBS device.

3. The method of claim 1 in which calculating the concentration of the said target element in the brine includes solving a function including the ratio of an averaged target element intensity data and the averaged reference element intensity data.

4. The method of claim 3 in which the function is based on an analysis of known brine concentrations.

5. The method of claim 3 in which the function includes a correction factor.

6. The method of claim 5 in which the correction factor includes intensity data for another brine element.

7. The method of claim 1 in which the aerosol stream is generated just before a first laser beam is directed to the aerosol stream and stops just after a last laser beam is directed to the aerosol stream during a test.

8. The method of claim 7 in which the collection system is energized just before the aerosol system is generated and de-energized just after the aerosol stream stops.

9. The method of claim 1 in which the laser beam is directed normal or near normal to the aerosol stream.

10. The method of claim 1 in which the brine is a lithium brine, the target element is lithium, and the reference brine element is hydrogen or oxygen.

11. The method of claim 1 in which the brine is a lithium brine and the target brine element is Na, K, B, Ca, and/or Mg.

12. The method of claim 1 in which the brine is a salt, calcium, iodine, magnesium, potash, bromine, boron, colloidal silicone, or soda ash brine.

13. A brine concentration measurement system comprising:
   a container of sampled brine;
   a collection system;
   an aerosol generator fluidly coupled to the brine in the container and configured to generate an aerosol stream of the sampled brine directed at the collection system; and
   a handheld LIBS device configured to:
      direct pulsed laser beams to the aerosol stream for a given test at a location between the aerosol generator and the collection system to generate a plasma,
      detect and average intensity data for a reference element in the aerosol stream based on the generated plasma,
      detect and average intensity data for a target element in the aerosol stream based on the generated plasma in order to calculate the concentration of said target element in the sampled brine.

14. The system of claim 13 further including means for calculating the concentration of said target element in the brine.

15. The system of claim 14 in which the means for calculating the concentration of said target element in the brine includes the handheld LIBS device.

16. The system of claim 13 in which the LIBS device is configured to solve a function including the ratio of averaged element brine target intensity data and averaged reference element intensity data.

17. The system of claim 16 in which the function is based on an analysis of known brine concentrations.

18. The system of claim 17 in which the function includes a correction factor.

19. The system of claim 18 in which the correction factor includes intensity data for another brine element.

20. The system of claim 13 in which the aerosol stream is generated just before a first laser beam is directed to the aerosol stream and stops just after a last laser beam is directed to the aerosol stream during a test.

21. The system of claim 20 in which the collection system is energized just before the aerosol system is generated and de-energized just after the aerosol stream stops.

22. The system of claim 13 in which the laser beam is directed normal or near normal to the aerosol stream.

23. The system of claim 13 in which the brine is a lithium brine, the target brine element is lithium, and the reference brine element is hydrogen or oxygen.

24. The system of claim 13 in which the brine is a lithium brine and the target brine element is Na, K, B, Ca, and/or Mg.

25. The system of claim 13 in which the brine is a salt, calcium, iodine, magnesium, potash, bromine, boron, colloidal silicone, or soda ash brine.

26. A method of detecting the concentration of lithium in a lithium brine, the method comprising:
   sampling the lithium brine into a container;
   using an aerosol generator to generate an aerosol stream of the sampled lithium brine in the container, said aerosol stream directed to a collection system;
   using a handheld LIBS device to:
      direct a laser beam to the aerosol stream at a location between the aerosol generator and the collection system to generate a plasma;

analyzing the plasma to detect hydrogen intensity data;
analyzing the plasma to detect lithium intensity data; and
calculating the concentration of lithium in the brine based on a function including the ratio of the hydrogen intensity data and the lithium intensity data.

27. A lithium brine concentration measurement system comprising:
a collection system;
an aerosol generator fluidly coupled to lithium brine in a container and configured to generate an aerosol stream of the sampled lithium brine directed at the collection system; and
a handheld LIBS device configured to:
direct a laser beam to the aerosol stream at a location between the aerosol generator and the collection system to generate a plasma,
detect intensity data for hydrogen in the aerosol stream,
detect intensity data for lithium in the aerosol stream, and
calculate the concentration of lithium in the sampled lithium brine using a function including the ratio of the lithium intensity data and hydrogen intensity data.

28. A brine concentration measurement system comprising:
a nose section fluidly connectable to an aerosol generator itself fluidly coupled to a brine sample and configured to generate an aerosol stream of the brine; and
a handheld LIBS device fitted to the nose section and configured to:
direct a laser beam to the aerosol stream to generate a plasma,
detect intensity data for a reference element in the aerosol stream based on the generated plasma, and
detect intensity data for a target element in the aerosol stream based on the generated plasma in order to calculate the concentration of said target element in the sampled brine.

29. The system of claim 28 in which the nose section is fluidly connectable to a collection system and the aerosol generator generates an aerosol stream directed at the collection system.

30. A spectroscopic method comprising:
using a handheld LIBS device in the field to analyze alloys, ores, powders, and/or scrap;
sampling a brine;
using an aerosol generator to generate an aerosol stream of the sampled brine;
using the handheld LIBS device to:
direct a laser beam aimed at the aerosol stream to generate a plasma; and
analyzing the plasma to detect intensity data of a reference element based on the generated plasma;
analyzing the plasma to detect intensity data of a target element based on the generated plasma; and
calculating the concentration of said target element in the brine based on the reference element intensity data and the target element intensity data.

31. A method of detecting the concentration of a target element in a brine, the method comprising:
sampling the brine into a container;
using an aerosol generator to generate an aerosol stream of the sampled brine in the container, said aerosol stream directed to a collection system;
using a handheld LIBS device to:
direct laser beams during a test to the aerosol stream at a location between the aerosol generator and the collection system to generate a plasma;
analyzing the plasma to detect a reference element intensity data based on the generated plasma;
analyzing the plasma to detect the intensity data of a target element based on the generated plasma;
calculating the concentration of said target element in the brine based on the reference element intensity data and the intensity data for said target element; and
generating the aerosol stream just before a first laser beam is directed to the aerosol stream and deenergizing the aerosol stream just after a last laser beam is directed to the aerosol stream during the test.

32. The method of claim 31 in which pulsed laser beams are directed to the aerosol stream for a given test and analyzing the plasma includes averaging the reference element intensity data for the pulsed laser beams and averaging the intensity data for said target element for the pulsed laser beams.

33. The method of claim 32 in which calculating the concentration of the said one or more brine elements in the brine includes solving a function including the ratio of an averaged target element brine intensity data and the averaged reference element intensity data.

34. The method of claim 33 in which the function is based on an analysis of known brine concentrations.

35. The method of claim 33 in which the function includes a correction factor.

36. The method of claim 35 in which the correction factor includes intensity data for another brine element.

37. The method of claim 31 in which the collection system is energized just before the aerosol system is generated and de-energized just after the aerosol stream stops.

38. The method of claim 31 in which the laser beam is directed normal or near normal to the aerosol stream.

39. The method of claim 31 in which the brine is a lithium brine, the target element is lithium, and the reference brine element is hydrogen or oxygen.

40. The method of claim 31 in which the brine is a lithium brine and the target brine element is Na, K, B, Ca, and/or Mg.

41. The method of claim 31 in which the brine is a salt, calcium, iodine, magnesium, potash, bromine, boron, colloidal silicone, or soda ash brine.

42. A method of detecting the concentration of lithium in a lithium brine, the method comprising:
sampling the lithium brine into a container;
using an aerosol generator to generate an aerosol stream of the sampled lithium brine in the container, said aerosol stream directed to a collection system;
using a handheld LIBS device to:
direct a laser beam to the aerosol stream at a location between the aerosol generator and the collection system to generate a plasma;
analyzing the plasma to detect hydrogen or oxygen intensity data based on the generated plasma;
analyzing the plasma to detect the intensity data of lithium based on the generated plasma; and
calculating the concentration of lithium in the brine based on the hydrogen or oxygen intensity data and the intensity data for lithium.

43. The method of claim 42 in which the analyzing and calculating steps are carried out by the handheld LIBS device.

44. The method of claim 42 in which pulsed laser beams are directed to the aerosol stream for a given test and analyzing the plasma includes averaging the hydrogen or oxygen intensity data for the pulsed laser beams and averaging the intensity data for lithium for the pulsed laser beams.

45. The method of claim 43 in which calculating the concentration lithium in the brine includes solving a function including the ratio of an averaged lithium element intensity data and the averaged hydrogen or oxygen intensity data.

46. The method of claim 45 in which the function is based on an analysis of known brine concentrations.

47. The method of claim 45 in which the function includes a correction factor.

48. The method of claim 47 in which the correction factor includes intensity data for another brine element.

49. The method of claim 42 in which the aerosol stream is generated just before a first laser beam is directed to the aerosol stream and stops just after a last laser beam is directed to the aerosol stream during a test.

50. The method of claim 49 in which the collection system is energized just before the aerosol system is generated and de-energized just after the aerosol stream stops.

51. The method of claim 42 in which the laser beam is directed normal or near normal to the aerosol stream.

52. A brine concentration measurement system comprising:
a container of sampled brine;
a collection system;
an aerosol generator fluidly coupled to the brine in the container and configured to generate an aerosol stream of the sampled brine directed at the collection system; and
a handheld LIBS device configured to:
direct laser beams to the aerosol stream at a location between the aerosol generator and the collection system to generate a plasma,
detect intensity data for a reference element in the aerosol stream based on the generated plasma,
detect intensity data for a target element in the aerosol stream based on the generated plasma in order to calculate the concentration of said target element in the sampled brine; and
a controller configured to generate the aerosol stream just before a first laser beam is directed to the aerosol stream and stop the aerosol stream just after a last laser beam is directed to the aerosol stream.

53. The system of claim 52 further including means for calculating the concentration of said target element in the brine.

54. The system of claim 53 in which the means for calculating the concentration of said target element in the brine includes the handheld LIBS device.

55. The system of claim 54 in which pulsed laser beams are directed to the aerosol stream for a given test and the LIBS device is configured to average the reference element intensity data for the pulsed laser beams and to average the intensity data for said target element for the pulsed laser beams.

56. The system of claim 55 in which the LIBS device is configured to solve a function including the ratio of averaged element brine target intensity data and averaged reference element intensity data.

57. The system of claim 56 in which the function is based on an analysis of known brine concentrations.

58. The system of claim 57 in which the function includes a correction factor.

59. The system of claim 58 in which the correction factor includes intensity data for another brine element.

60. And the system of claim 52 in which the controller is further configured to energize the collection system just before the aerosol system is generated and de-energized the collection system just after the aerosol stream stops.

61. The system of claim 52 in which the laser beam is directed normal or near normal to the aerosol stream.

62. The system of claim 52 in which the brine is a lithium brine, the target brine element is lithium, and the reference brine element is hydrogen or oxygen.

63. The system of claim 52 in which the brine is a lithium brine and the target brine element is Na, K, B, Ca, and/or Mg.

64. The system of claim 52 in which the brine is a salt, calcium, iodine, magnesium, potash, bromine, boron, colloidal silicone, or soda ash brine.

65. A lithium brine concentration measurement system comprising:
a container of sampled lithium brine;
a collection system;
an aerosol generator fluidly coupled to the lithium brine in the container and configured to generate an aerosol stream of the sampled lithium brine directed at the collection system; and
a handheld LIBS device configured to:
direct a laser beam to the aerosol stream at a location between the aerosol generator and the collection system to generate a plasma,
detect intensity data for hydrogen or oxygen in the aerosol stream based on the generated plasma, and
detect intensity data for lithium in the aerosol stream based on the generated plasma in order to calculate the concentration of lithium in the sampled brine.

66. The system of claim 65 further including means for calculating the concentration lithium in the brine.

67. The system of claim 66 in which the means for calculating the concentration of lithium in the brine includes the handheld LIBS device.

68. The system of claim 67 in which pulsed laser beams are directed to the aerosol stream for a given test and the LIBS device is configured to average the hydrogen or oxygen intensity data for the pulsed laser beams and to average the lithium intensity data for the pulsed laser beams.

69. The system of claim 67 in which the LIBS device is configured to solve a function including the ratio of averaged lithium intensity data and averaged hydrogen or oxygen intensity data.

70. The system of claim 69 in which the function is based on an analysis of known brine concentrations.

71. The system of claim 70 in which the function includes a correction factor.

72. The system of claim 71 in which the correction factor includes intensity data for another brine element.

73. The system of claim 65 in which the aerosol stream is generated just before a first laser beam is directed to the aerosol stream and stops just after a last laser beam is directed to the aerosol stream during a test.

74. The system of claim 73 in which the collection system is energized just before the aerosol system is generated and de-energized just after the aerosol stream stops.

75. The system of claim 65 in which the laser beam is directed normal or near normal to the aerosol stream.

\* \* \* \* \*